(12) United States Patent
Kim et al.

(10) Patent No.: US 8,792,471 B2
(45) Date of Patent: Jul. 29, 2014

(54) METHOD AND APPARATUS FOR TRANSMITTING AND RECEIVING SERVICE IN A WIRELESS COMMUNICATION SYSTEM

(75) Inventors: Sun-Ju Kim, Suwon-si (KR); Jeong-Hoon Park, Suwon-si (KR); Sung-Wook Park, Seongnam-si (KR); Jai-Ho Lee, Anyang-si (KR)

(73) Assignee: Samsung Electronics Co., Ltd., Suwon-Si (KR)

(\*) Notice: Subject to any disclaimer, the term of this patent is extended or adjusted under 35 U.S.C. 154(b) by 659 days.

(21) Appl. No.: 12/804,992

(22) Filed: Aug. 3, 2010

(65) Prior Publication Data

US 2011/0032834 A1 Feb. 10, 2011

(30) Foreign Application Priority Data

Aug. 4, 2009 (KR) ........................ 10-2009-0071723

(51) Int. Cl.
 *H04J 3/24* (2006.01)
(52) U.S. Cl.
 USPC ....... 370/349; 370/329; 370/395.21; 370/392
(58) Field of Classification Search
 USPC ............ 370/329, 315, 395.21, 328, 392, 342, 370/310, 352, 349
 See application file for complete search history.

(56) References Cited

U.S. PATENT DOCUMENTS

| 6,438,122 | B1 * | 8/2002 | Monrad et al. | 370/349 |
| 7,630,338 | B2 * | 12/2009 | Vesterinen et al. | 370/329 |
| 8,027,293 | B2 * | 9/2011 | Spaur et al. | 370/329 |
| 8,374,636 | B2 * | 2/2013 | McDonough | 455/466 |
| 8,391,274 | B2 * | 3/2013 | Choo et al. | 370/352 |

\* cited by examiner

*Primary Examiner* — Chandrahas Patel

(57) ABSTRACT

A method and apparatus transmits and receives a service in a wireless communication system by acquiring Quality of Service (QoS) information. A packet is received through a direct communication with a terminal equipment providing a service. When the received packet includes a new destination Internet Protocol (IP) address different from a previously received packet, one or more service quality identifiers corresponding to the received packet are identified. The identified service quality identifiers are transmitted to the terminal equipment, and a service quality identifier corresponding to a service category selected by a user from the identified service categories is received from the terminal equipment. QoS information corresponding to the received service quality identifier is determined and used to generate a radio link between the mobile equipment and a mobile communication network. And the service is received through the radio link.

20 Claims, 10 Drawing Sheets

METHOD AND APPARATUS FOR TRANSMITTING AND RECEIVING SERVICE IN A WIRELESS COMMUNICATION SYSTEM

CROSS-REFERENCE TO RELATED APPLICATION(S) AND CLAIM OF PRIORITY

The present application is related to and claims the priority under 35 U.S.C. §119(a) of an application entitled "Method And Apparatus For Transmitting And Receiving Service In A Wireless Communication System" filed in the Korean Industrial Property Office on Aug. 4, 2009 and assigned Serial No. 10-2009-0071723, the contents of which are hereby incorporated by reference.

TECHNICAL FIELD OF THE INVENTION

The present invention relates to a wireless communication system, and more particularly to a method and an apparatus for transmitting and receiving a service in a wireless communication system.

BACKGROUND OF THE INVENTION

With development in the high speed wireless data communication technology, such as Long Term Evolution (LTE), High-Speed Packet Access (HSPA), and High Rate Packet Data (eHRPD), users of a terminal equipment, such as a Personal Computer (PC), can receive a real time service through a mobile communication network, such as a Voice over Internet Protocol (VoIP) phone (Internet phone) service or an image communication service, by using a corresponding application.

The terminal equipment can use a mobile equipment in order to access a mobile communication network. At this time, the mobile equipment is required to secure a guaranteed Quality of Service (QoS) corresponding to a service that enables the user to achieve an optimal use of the service. Therefore, the mobile equipment generates a wireless link for transmitting and receiving a service according to QoS information of an application being executed in the terminal equipment, i.e. an application for providing the service.

It is impossible for a conventional mobile equipment to take QoS information from an application of a terminal equipment. Accordingly, the application of the terminal equipment should transmit the QoS information to a corresponding mobile equipment by using an Application Programming Interface (API) provided by a modem.

For this reason, a particular interface for transmitting and receiving QoS information is constructed between a mobile equipment and an application of a terminal equipment. When the mobile equipment has received QoS information through the interface, the mobile equipment generates a wireless link in response to the received QoS information. Further, the mobile equipment receives a service from a corresponding application by using the generated wireless link.

A process of information transmission and reception between a terminal equipment and a mobile equipment in a conventional wireless communication system will be described in detail with reference to FIG. 1.

FIG. 1 illustrates a conventional wireless communication system for transmitting and receiving a service.

Referring to FIG. 1, the conventional wireless communication system includes a terminal equipment 100 for providing a service to a user and a mobile equipment 120 for accessing a mobile communication network and transmitting a service to the terminal equipment 100.

First, the terminal equipment 100 includes three applications 102, 104, and 106 for providing an e-mail service, an internet phone (VoIP) service and an image conference (Net meeting) service, respectively.

Each of the applications 102, 104, and 106 includes an interface 108, 110, or 112 for transmitting QoS information to the mobile equipment 120. Each of the applications 102, 104, and 106 notifies the mobile equipment 120, by using the interface 108, 110, or 112, of the execution of the service, and requests the mobile equipment 120 to generate a wireless link for the service according to the transmission of the QoS information.

The applications 102, 104, and 106 are configured in accordance with the type and version of the software installed in the mobile equipment 120. Therefore, the applications 102, 104, and 106 can provide a corresponding service only through a mobile equipment using particular software. Further, the applications 102, 104, and 106 should be updated whenever the type and version of the software are changed.

Meanwhile, the mobile equipment 120 includes a communication module 122 for performing a communication with the applications 102, 104, and 106 of the mobile equipment 120. The communication module 122 receives QoS information transmitted from an application selected by the user from among the applications 102, 104, and 106, and generates a wireless link by using the received QoS information. Further, the communication module 122 receives a service from a corresponding application by using the generated wireless link.

As described above, an application of a terminal equipment is not universal for multiple mobile equipments and is dependent on a specific mobile equipment. That is, the application of the terminal equipment depends on the software used by a corresponding mobile equipment.

Therefore, the user can only receive a service from a particular terminal equipment, according to the software employed by the mobile equipment used by the user. Moreover, when the software of the mobile equipment is changed, the terminal equipment should update corresponding software or employ another application or an additional interface in order to continuously provide the service.

SUMMARY OF THE INVENTION

To address the above-discussed deficiencies of the prior art, it is a primary object to provide a method and an apparatus for transmitting and receiving a service in a wireless communication system.

Also, the present invention provides a method and an apparatus for service transmission and reception, which enable a terminal equipment to provide an application service through a mobile communication network to a user by using a mobile equipment in a wireless communication system.

Moreover, the present invention provides a method and an apparatus for service transmission and reception which enable a mobile equipment to acquire QoS information regardless of the application of a terminal equipment in a wireless communication system.

In addition, the present invention provides a method and an apparatus for service transmission and reception by which a mobile equipment connected to a terminal equipment can acquire exact QoS information according to a corresponding service in a wireless communication system, such that a user of the terminal equipment can use an optimum service according to the acquired QoS information.

In accordance with an aspect of the present invention, there is provided a method of receiving a service by a mobile equipment in a wireless communication system, the method including receiving a packet through a direct communication with a terminal equipment providing a service. When the received packet includes a new destination Internet Protocol (IP) address different from an IP address of a previously received packet, one or more service quality identifiers corresponding to the received packet are identified. The identified service quality identifiers are transmitted to the terminal equipment, and a service quality identifier corresponding to a service category selected by a user from among the identified one or more service categories is received from the terminal equipment. Quality of Service (QoS) information corresponding to the received service quality identifier is determined. A radio link between the mobile equipment and a mobile communication network is generated according to the acquired QoS information, and the service from the mobile communication network is received through the radio link.

In accordance with another aspect of the present invention, there is provided a method of transmitting a service by a terminal equipment in a wireless communication system. The method includes transmitting a packet through a direct communication to a mobile equipment connected to a mobile communication network and receiving a service quality identifiers corresponding to one or more service categories according to the transmitted packet from the mobile communication network. One among the one or more service categories corresponding to the received one or more service quality identifiers is selected by a user. The selected service quality identifier corresponding to the service category selected by the user is transmitted to the mobile equipment and, when a radio link is generated between the mobile equipment and the mobile communication network, the service transmitted through the radio link is provided to the user.

In accordance with another aspect of the present invention, there is provided an apparatus for receiving a service within a mobile equipment in a wireless communication system. The apparatus includes a direct communication unit receives a packet through a direct communication with a terminal equipment providing a service, transmits one or more service quality identifiers identified based on the received packet to the terminal equipment, and receives a selected service quality identifier selected by a user from among the one or more service quality identifiers corresponding to the received. A packet processing unit, when the received packet includes a new destination Internet Protocol (IP) address different from an IP address of a previously received packet, identifies the one or more service quality identifiers corresponding to the received packet. A Quality of Service (QoS) information processing unit acquires QoS information corresponding to the received service quality identifier. A wireless communication unit generates a radio link between the mobile equipment and a mobile communication network according to the acquired QoS information and receives the service from the mobile communication network through the radio link.

In accordance with yet another aspect of the present invention, there is provided an apparatus for transmitting a service in a wireless communication system. The apparatus includes a transmission/reception unit for transmitting a packet through a direct communication to a mobile equipment connected to a mobile communication network, receiving service quality identifiers corresponding to one or more service categories according to the transmitted packet from the mobile communication network, and transmitting a service quality identifier corresponding to a service category selected by the user to the mobile equipment. An input unit receives a selection of one service category from the one or more service categories corresponding to the received service quality identifier. An application unit, when a radio link is generated between the mobile equipment and the mobile communication network, provides the service transmitted through the radio link to the user.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention proposes a method and an apparatus for transmitting and receiving a service in a high speed wireless communication system, such as a Long Term Evolution (LTE) system, a High-Speed Packet Access (HSPA) system, and a High Rate Packet Data (eHRPD) system. Specifically, the present invention proposes a method and an apparatus for transmitting and receiving a service in a wireless data communication system by which a terminal equipment can provide an application service through a mobile communication network to a user by using a mobile equipment. Further, the present invention proposes a method and an apparatus for transmitting and receiving a service in a wireless data communication system by which a mobile equipment can acquire QoS information regardless of an application of a terminal equipment.

For convenience of description, the following description of the present invention employs a Personal Computer (PC) as an example of the terminal equipment. However, the terminal equipment may be other devices, such as a Personal Digital Assistant (PDA) and a mobile communication terminal providing a service, as well as the PC.

Hereinafter, a wireless communication system for service transmission/reception between a terminal equipment and a mobile equipment according to an embodiment of the present invention will be described with reference to FIG. 2.

Figure 2:
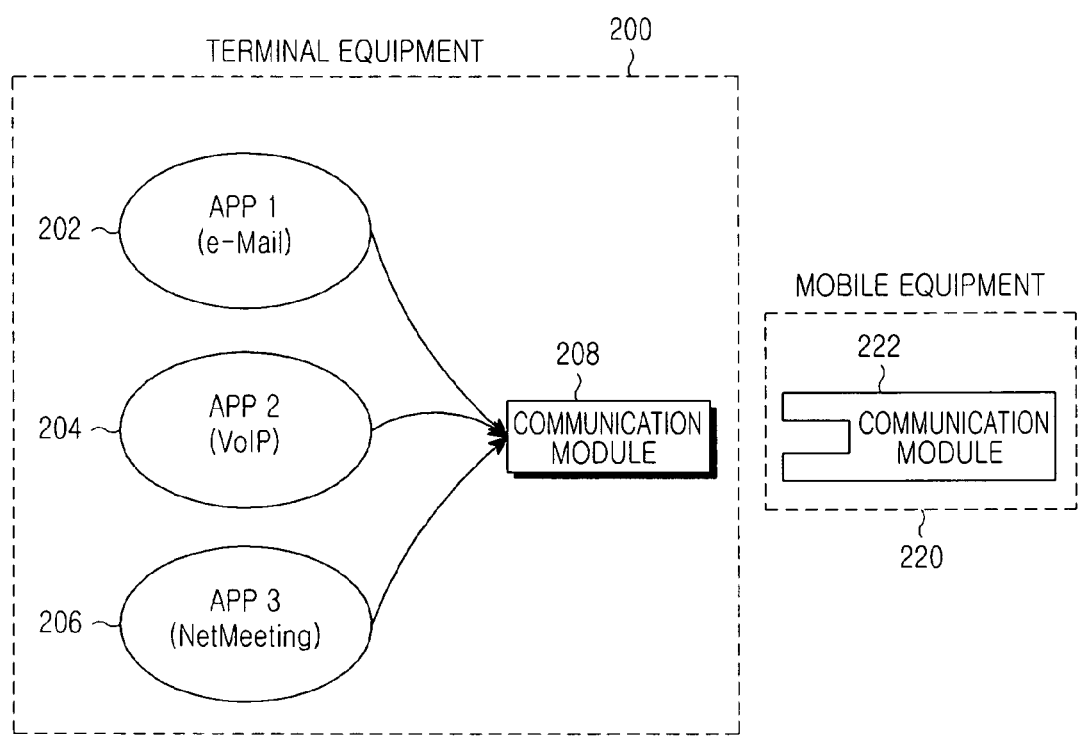
FIG. 2 illustrates a wireless communication system for service transmission/reception according to an embodiment of the present invention.

FIG. 2 illustrates a wireless communication system for service transmission/reception according to an embodiment of the present invention.

Referring to FIG. 2, a wireless communication system for service transmission/reception, according to an embodiment of the present invention, includes a terminal equipment 200 for providing a service to a user and a mobile equipment 220 for accessing a mobile communication network and transmitting a service to the terminal equipment 200. The terminal equipment 200 and the mobile equipment 220 are interconnected through a Universal Serial Bus (USB) or Personal Computer Memory Card International Association (PCMCIA) slot, and such. That is, the terminal equipment 200 and the mobile equipment 220 can perform a direct communication with each other.

First, the terminal equipment 200 includes three applications 202, 204, and 206 for providing an e-mail service, an internet phone (VoIP) service, and an image conference (Net meeting) service, respectively. Although FIG. 2 shows only three applications 202, 204, and 206, the terminal equipment 200 may further include at least one application for providing a game, image communication, or Video On Demand (VOD) service in addition to the three applications 202, 204, and 206, or may include less than three applications.

The terminal equipment 200 includes a communication module 208 for performing a communication with the mobile equipment 220 in order to access a mobile communication network. The applications 202, 204, and 206 provide a service through the mobile communication network by using the communication module 208.

The communication module 208 is not dependent on the software installed in the mobile equipment 220. That is, although each application within a terminal equipment should be updated according to version information and type of software installed in the mobile equipment 220, the mobile equipment 220 and the terminal equipment 200 can be interconnected through the communication module 208 even without update of the applications 202, 204, and 206 in the present embodiment.

As a result, the terminal equipment 200 can provide a service to users by using various mobile communication apparatuses regardless of whether it is a terminal equipment provided with particular software.

Meanwhile, the mobile equipment 220 includes a communication module 222 for performing a communication with the applications 202, 204, and 206 of the terminal equipment 200.

The mobile equipment 220 acquires QoS information of an application selected by a user from among the applications 202, 204, and 206 of the terminal equipment 200 by communicating with the terminal equipment 200 through the communication module 222. The mobile equipment 220 generates a wireless link corresponding to the acquired QoS information, and receives a service from the selected application by using the generated wireless link. The operation of acquiring the QoS information and generating a wireless link by the mobile equipment 220 will be described later in more detail.

Hereinafter, a construction of the terminal equipment 200 and the mobile equipment 220 in the wireless communication system, as described above, will be discussed in more detail. The following discussion mainly deals with the communication module 208 of the terminal equipment 200 and the communication module 222 of the mobile equipment 220.

Figure 3:
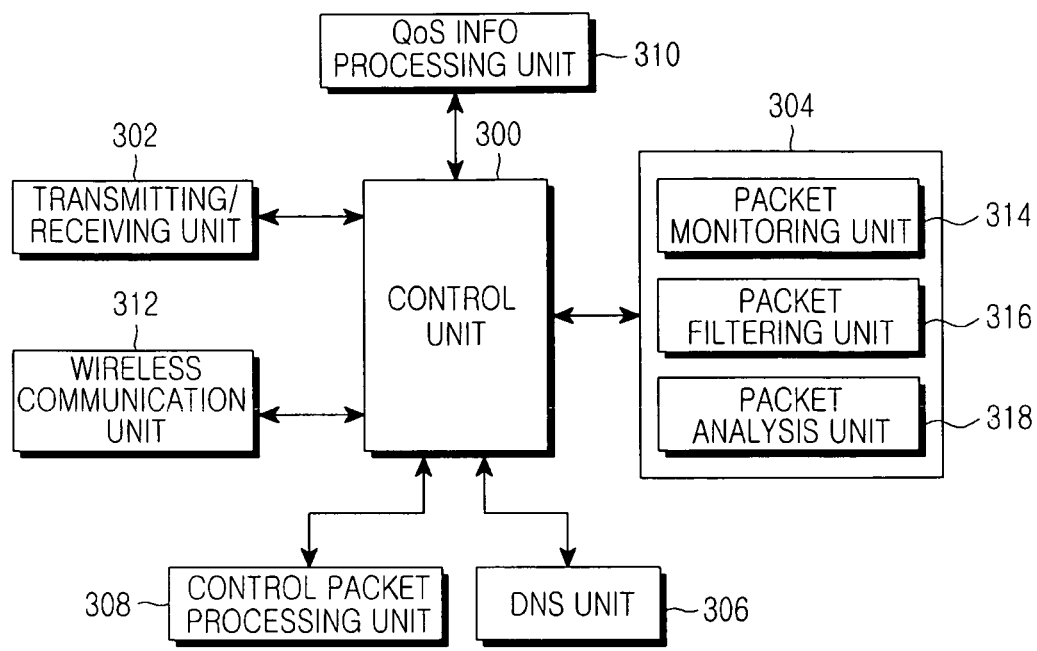
FIG. 3 illustrates a mobile equipment receiving a service in a wireless communication system according to an embodiment of the present invention.

FIG. 3 illustrates a mobile equipment configured to receive a service in a wireless communication system according to an embodiment of the present invention.

As described above, the mobile equipment 220 includes a communication module 222 for receiving a service from the applications 202, 204, and 206 of the terminal equipment 200. The communication module 222 includes a control unit 300, a transmitting/receiving unit 302, a packet processing unit 304, a Domain Name System (DNS) unit 306, a control packet processing unit 308, a QoS information processing unit 310, and a wireless communication unit 312.

First, the control unit 300 controls the general operation of the transmitting/receiving unit 302, the packet processing unit 304, the DNS unit 306, the control packet processing unit 308, the QoS information processing unit 310, and the wireless communication unit 312.

The transmitting/receiving unit 302 enables the mobile equipment 220 to transmit and receive packets or messages through a direct communication with the terminal equipment 200. Specifically, the transmitting/receiving unit 302 receives packets transmitted through a USB or PCMCIA slot from the terminal equipment 200, wherein the received packets refer to service packets provided by an application of the terminal equipment 200. The transmitting/receiving unit 302 can receive the service packets when the user newly executes an application, which is not being executed, or accesses another Uniform Resource Locator (URL) different from a currently connected URL.

The transmitting/receiving unit 302 transmits or receives a control message to or from the terminal equipment 200 through the USB or PCMCIA slot. The control message is a message for acquiring QoS of the mobile equipment 220, and will be described later in more detail.

Meanwhile, according to an embodiment of the present invention, the transmitting/receiving unit 302 may include a transmission unit and a reception unit separated from each other. The transmitting/receiving unit 302 may be a host interface for communication with an external device.

The packet processing unit 304 includes a packet monitoring unit 314, a packet filtering unit 316, and a packet analysis unit 318 for processing the packets received through the transmitting/receiving unit 302.

The packet monitoring unit 314 monitors all packets received through the transmitting/receiving unit 302. The packet filtering unit 316 checks a target Internet Protocol (IP) address of a packet monitored by the packet monitoring unit 314, and determines whether the checked IP address is different from a destination IP address of a previously received packet.

Further, when the checked IP address is different from a destination IP address of a previously received packet, the packet filtering unit 316 recognizes the packet as a new packet and the checked destination IP address of the packet to the DNS unit 306.

The packet analysis unit 318 analyzes the service to which the packet is related based on the destination IP address of the packet, the protocol, and the port number. The packet analysis unit 318 acquires the information, including the protocol, the port number, and such, from URL information output from the DNS unit 306, i.e. the URL information corresponding to the destination IP address of the packet. Further, the packet analysis unit 318 identifies a QoS Class Identifier (QCI) that corresponds to the packet based on a QoS index mapping table stored in advance. For example, the QoS index mapping table may be configured as shown in Table 1 below.

TABLE 1

| Application\packet information | Destination IP address | Protocol | Port No. | Selectable QCI |
|---|---|---|---|---|
| Internet phone (VoIP) | New address | UDP | 5060 → | 1 |
| Image communication | New address | UDP | 5060 → | 2, 6 |
| VOD | New address | UDP | 554 → | 3 |
| GAME | New address | UDP | → | 4, 6 |
| E-mail/HTTP/FTP | New address | TCP | → | 7, 8, 9 |
| Others | New address | | → | 1-9 |

Figure 1:
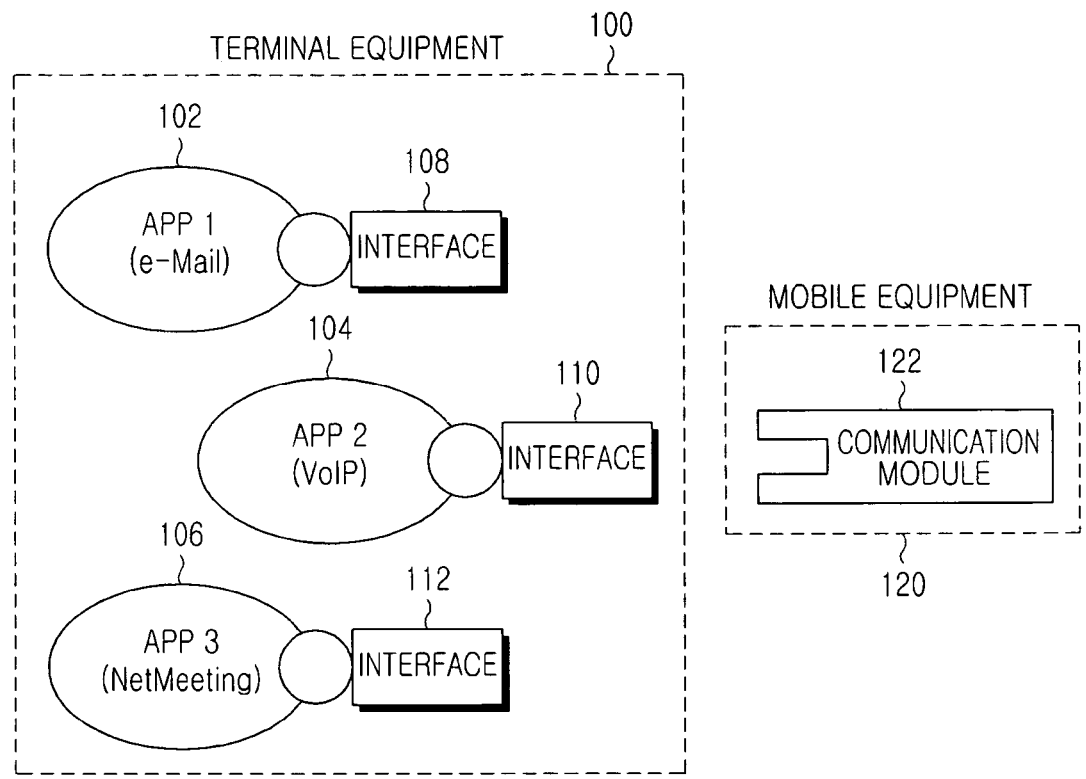
FIG. 1 illustrates a wireless communication system for transmitting and receiving a service according to the present disclosure.

It is noted from FIG. 1 that the QCI is determined by the destination IP address, protocol, and port number of a packet for each application. For example, when the protocol of a packet is User Datagram Protocol (UDP) and the port number of the packet is 5060, the packet analysis unit 318 determines that the packet is a Session Initiated Protocol (SIP) packet, which provides an Internet Phone service or image communication service. Further, the packet analysis unit 318 identifies QCIs '1', '2', and '6', which correspond to the Internet phone service and the image communication service as selectable QCIs, and outputs information of the identified selectable QCIs together with corresponding URL information to the control packet processing unit 308 under the control of control unit 300.

The DNS unit 306 converts the destination IP address of the packet to Uniform Resource Locator (URL) information and then stores the URL information. Further, under the control of the control unit 300, the DNS unit 306 transmits the URL information to the packet analysis unit 318.

The control packet processing unit 308 receives a packet analysis result output from the packet analysis unit 318. The packet analysis result includes URL information and the selectable CQI information indicating categories which can be provided by the packet. For example, the selectable CQI information may include QCI '1' indicating the Internet phone service and QCIs '2' and '6' indicating the image communication service.

The control packet processing unit 308 generates a control message for QoS acquisition by using the URL information and the selectable CQI information. The control message is generated in the form as shown in FIG. 4, according to an embodiment of the present invention.

Figure 4:
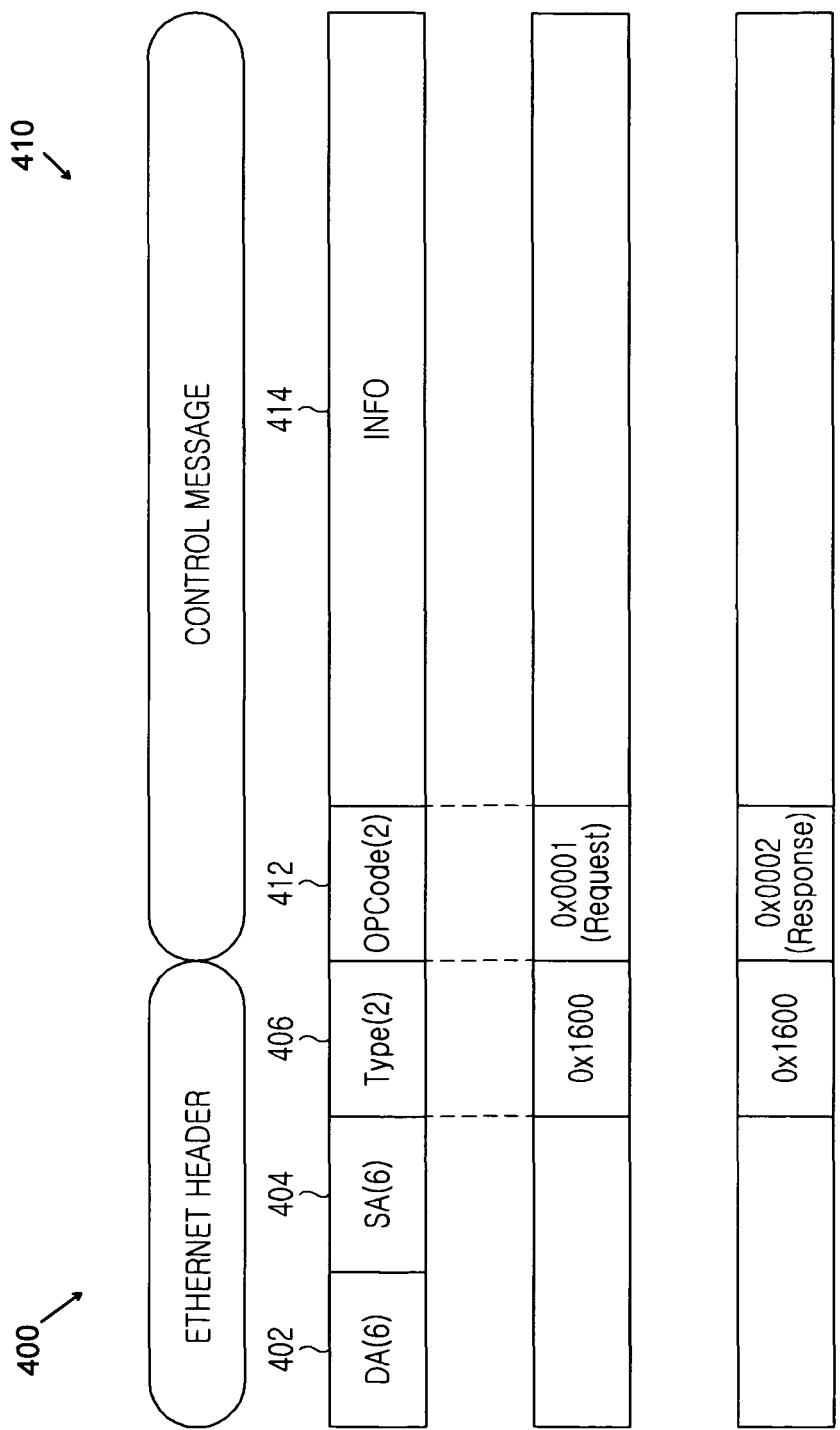
FIG. 4 illustrates a configuration of a control message transmitted and received between a mobile equipment and a terminal equipment according to an embodiment of the present invention.

Referring to FIG. 4, the control message includes an Ethernet header part 400 that includes identification information of a corresponding control message and a control message part 410 that includes information to be actually transmitted.

The Ethernet header part 400 includes a destination address (DA) field 402, a source address (SA) field 404, and a type field 406. The DA field 402 and the SA field 404 include Media Access Control (MAC) addresses of the receiver and the transmitter, i.e. MAC addresses of the terminal equipment 200 and the mobile equipment 220. Further, the type field 406 defines a protocol of a network layer.

The control message part 410 includes an operation (OP) code field 412 and a data field 414. The OP code field 412 includes a particular operation to be executed, and the data field 414 includes information to be actually transmitted, that is, the URL information and the selectable QCI information.

When a control message such as one described above is generated in the control packet processing unit 308, the control unit 300 transmits the generated control message to the terminal equipment 200 through the transmitting/receiving unit 302.

Upon receiving a control message including QCI information selected by the user (that is, QCI information indicating the service category selected by the user) from among the selectable QCI information from the terminal equipment 200 as a response to the transmission of the control message including the selectable QCI information, the QoS information processing unit 310 acquires the QCI information from the received control message. Further, the QoS information processing unit 310 acquires QoS information corresponding to the acquired QCI information, such as QoS parameter information.

In the meantime, when the selectable QCI information output from the packet analysis unit 318 includes a single QCI information item, the QoS information processing unit 310 can acquire QoS information corresponding to the single QCI information item. For example, when the selectable QCI information includes QCI '3', only the VOD service corresponding to QCI '3' can be acquired. Therefore, the control packet processing unit 308 does not need to generate a control message in this situation.

Upon acquiring the QoS information, the wireless communication unit 312 transmits a Packet Data Protocol (PDP) context request message including the QoS information to a management node of a mobile communication network in order to generate a wireless link with the mobile communication network. The management node may be, for example, a Serving General Packet Radio Service (GPRS) Support Node (SGSN).

The PDP context request message is a message through which the mobile equipment 220 requests a connection for transmission/reception of a packet with the management node. After transmitting the PDP context request message, the wireless communication unit 312 can establish a connection with the management node, i.e. a wireless link. The wireless communication unit 312 generates a new session with the management node and receives the corresponding service packet and allocated radio resources from the management node. Thereafter, the wireless communication unit 312 sets a radio access bearer. At this time, the wireless communication unit 312 sets a packet filter for receiving the corresponding service packet.

The packet filter receives service packets, which have been transmitted from the management node, according to preset filter values. That is, the packet filter enables packets according to an application providing a service selected by a user to be received through the set radio access bearer from the management node. Therefore, the mobile equipment 220 can continuously transmit the packets according to the application to the terminal equipment 200.

The mobile equipment 220 that includes the construction as described above can acquire accurate QoS information for use of a service from various terminal equipments regardless of the installation of particular software. Furthermore, the mobile equipment 220 acquires QoS information according to the QCI information, so as to enable a user of the terminal equipment 200 to use a service with an optimum quality.

Next, the terminal equipment 200 according to an embodiment of the present invention will be described with reference to FIG. 5.

Figure 5:
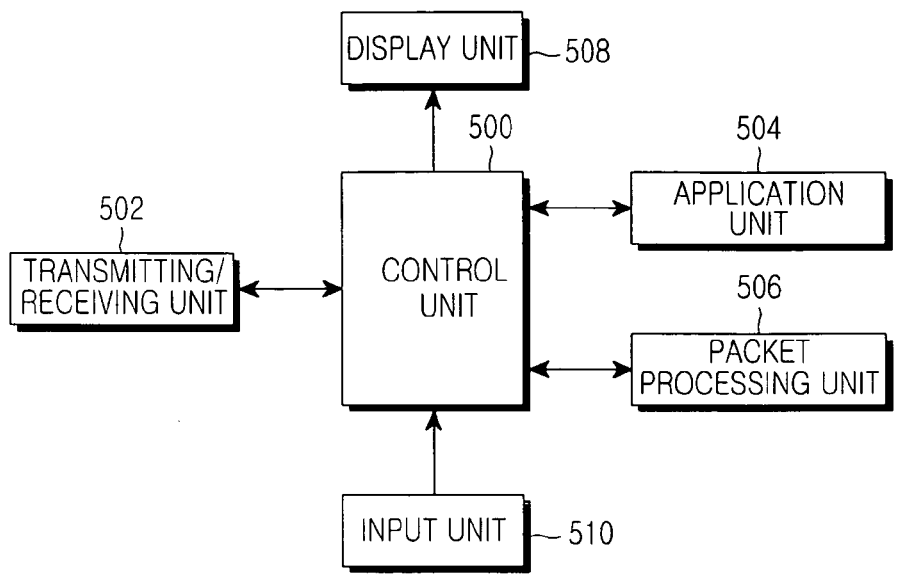
FIG. 5 illustrates a construction of a terminal equipment providing a service in a wireless communication system according to an embodiment of the present invention.

FIG. 5 illustrates a terminal equipment providing a service in a wireless communication system according to an embodiment of the present invention.

Referring to FIG. 5, the terminal equipment 200 includes a control unit 500, a transmission/reception unit 502, an application unit 504, a packet processing unit 506, a display unit 508, and an input unit 510. The transmission/reception unit 502 and packet processing unit 506 may perform the same function as the communication module 208 for providing a service to the mobile equipment 220 as described above with reference to FIG. 2.

The control unit 500 controls the general operation of the transmission/reception unit 502, the application unit 504, the packet processing unit 506, the display unit 508, and the input unit 510.

The transmission/reception unit 502 transmits a packet to the mobile equipment 220 through a USB or PCMCIA slot. When the user newly executes an application or accesses another Uniform Resource Locator (URL) different from a currently connected URL, the transmitting/receiving unit 502 transmits a service packet, which is provided through the application or the URL, to the mobile equipment 220. After transmitting the packet, the transmission/reception unit 502 performs transmission/reception of a control message with the mobile equipment 220.

Although the transmission/reception unit 502 is a single unit in FIG. 5, the transmission/reception unit 502 may be separated to a transmission unit and a reception unit according to another embodiment of the present invention. Furthermore, according to the present embodiment based on an example in which the terminal equipment 200 is a personal computer, the transmission/reception unit 502 may be a device driver functioning as an interface between hardware and the application unit 504 and an operating system.

The application unit 504 includes applications that provide services related to Internet phone, image communication, e-mail, image conference, game, and so forth. Furthermore, the application unit 504 executes at least one of the applications according to the user's selection.

Upon receiving a control message including URL information and selectable QCI information from the mobile equipment 220, the packet processing unit 506 parses the received control message according to the control of the control unit 500. Further, the packet processing unit 506 acquires the URL information and the selectable QCI information from the parsed control message. Further, the packet processing unit 506 transmits the acquired URL information and selectable QCI information to the control unit 500.

Thereafter, the packet processing unit 506 receives an input regarding a service category selected by the user from among service categories corresponding to the selectable QCI information through the control unit 500. Further, the packet processing unit 506 identifies QCI information corresponding to the input service category information. At this time, the packet processing unit 506 can identify the QCI information by using a service category-based QCI mapping table stored in advance. For example, the pre-stored service category-based QCI mapping table may be configured as shown in Table 2 below.

TABLE 2

| QCI | Resource Type(bit rate included if GBR) | Priority | Packet Delay Budget | Packet Error Loss Rate | Service Category | eHRPD Flow Profile ID | eHRPD Flow Description |
|---|---|---|---|---|---|---|---|
| 1 | GBR (32.8 kbps[1]) | 2 | 100 ms | $10^{-2}$ | Conversational Voice | 0x100 | Conversational Rate Set 1 Speech |
| 1 | GBR (37.6 kbps[1]) | 2 | 100 ms | $10^{-2}$ | Conversational Voice | 0x101 | Conversational Rate Set 2 Speech |
| 2 | GBR (24 kbps) | 4 | 150 ms | $10^{-3}$ | Conversational Video (Live Streaming) | 0x0300 | Conversational Video Streaming |
| 2 | GBR (32 kbps) | 4 | 150 ms | $10^{-3}$ | Conversational Video (Live Streaming) | 0x0301 | Conversational Video Streaming |

TABLE 2-continued

| QCI | Resource Type(bit rate included if GBR) | Priority | Packet Delay Budget | Packet Error Loss Rate | Service Category | eHRPD Flow Profile ID | eHRPD Flow Description |
|---|---|---|---|---|---|---|---|
| 2 | GBR (40 kbps) | 4 | 150 ms | $10^{-3}$ | Conversational Video (Live Streaming) | 0x0302 | Conversational Video Streaming |
| 2 | GBR (48 kbps) | 4 | 150 ms | $10^{-3}$ | Conversational Video (Live Streaming) | 0x0303 | Conversational Video Streaming |
| 2 | GBR (64 kbps) | 4 | 150 ms | $10^{-3}$ | Conversational Video (Live Streaming) | 0x0305 | Conversational Video Streaming |
| 3 | GBR (24 kbps) | 5 | 300 ms | $10^{-6}$ | Non-Conversational Video (Buffered Streaming) | 0x030c | Video Streaming |
| 3 | GBR (64 kbps) | 5 | 300 ms | $10^{-6}$ | Non-Conversational Video (Buffered Streaming) | 0x030e | Video Streaming |
| 3 | GBR (128 kbps) | 5 | 300 ms | $10^{-6}$ | Non-Conversational Video (Buffered Streaming) | 0x0311 | Video Streaming |
| 4 | GBR | 3 | 50 ms | $10^{-3}$ | Real Time Gaming | 0x0600 | Interactive Gaming |
| 5 | | 1 | 100 ms | $10^{-6}$ | IMS Signaling | 0x0500 | Conventional Control Signaling |
| 6 | | 7 | 100 ms | $10^{-3}$ | Voice, Video (Live Streaming), Interactive Gaming | 0x0301 | Conversational Video Streaming |
| 7 | Non-GBR | 6 | | | TCP-based (e.g. www, e-mail, chat, ftp, p2p file sharing, progressive video, and such) | 0x0 | Best effort |
| 8 | | 8 | 300 ms | $10^{-6}$ | | 0x0 | Best effort |
| 9 | | 9 | | | | 0x0 | Best effort |

As shown, Table 2 includes a QCI field, a resource type field indicating a corresponding bit rate when a Guaranteed Bit Rate (GBR) is used, a priority field, a packet delay budget field, a packet error loss rate field, a service category field, an eHRPD flow profile ID field, and an eHRPD flow description field.

According to an embodiment of the present invention, the QCI field and the service category field are used from among the fields of the service category-based QCI mapping table. However, other fields, as well as the two fields, can be used according to another embodiment of the present invention.

Referring to the QCI field and the service category field, it is noted that a corresponding QCI is determined according to the service category. That is, the Internet phone service (conventional voice service) corresponds to QCI '1', the image communication service (conventional video (live streaming) service) corresponds to QCIs '2' and '6', the VOD service (Non-conventional video (buffered streaming) service) corresponds to QCI '3', the game service (real time gaming service) corresponds to QCI '5', and a Transmission Control Protocol (TCP) based service, such as services associated with e-mail, Hypertext Transport Protocol (HTTP), File Transfer Protocol (FTP), and chatting, corresponds to QCIs '7', '8', and '9'.

For example, when the selectable QCI information includes QCIs '1', '2', and '6', the user can select one service category from among the Internet phone service corresponding to QCI '1' and the image communication service corresponding to QCIs '2' and '6'. The packet processing unit 506 then identifies QCI information corresponding to the selected service category and generates a control message including the identified QCI information. The control message has the same format as that of the control message generated by the mobile equipment 220 as shown in FIG. 4.

Figure 6:
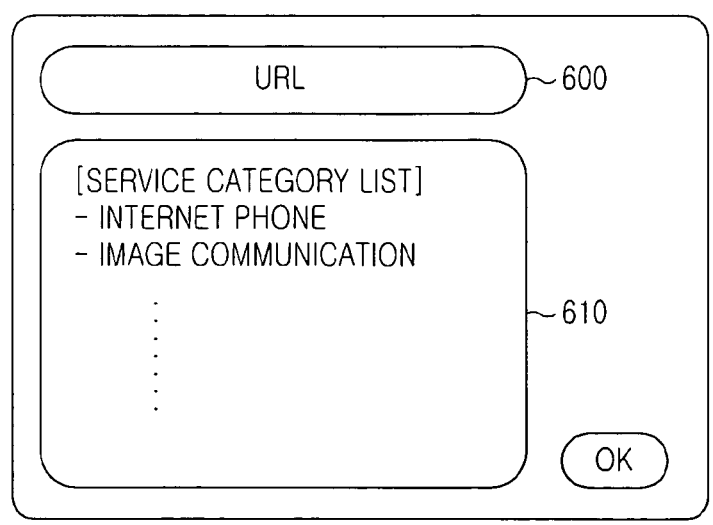
FIG. 6 illustrates a screen for selection of a service category displayed on a display unit of a terminal equipment according to an embodiment of the present invention.

Under the control of the control unit 500, the display unit 508 provides a screen as shown in FIG. 6 to the user by using the acquired URL information and selectable QCI information.

FIG. 6 illustrates a screen for selection of a service category displayed on a display unit of a terminal equipment according to an embodiment of the present invention.

Referring to FIG. 6, the display unit 508 displays the URL information 600 and a service category list 610 that includes the selectable QCI information. The control unit 500 uses the service category-based QCI mapping table in controlling the display of service categories corresponding to the selectable QCI information on the display unit 508.

For example, when the selectable QCI information includes QCIs '1', '2', and '6', the display unit 508 displays service categories of the Internet phone service corresponding to QCI '1' and the image communication service corresponding to QCIs '2' and '6'. Further, the display unit 508 displays a screen on which a user can select a desired service category from among the displayed service categories.

The input unit 510 receives an input of one service category by the user from among the service categories displayed on the display unit 508, and then transmits information on the input service category to the control unit 500. Then, the control unit 500 identifies QCI information corresponding to the input service category and outputs the identified QCI information to the packet processing unit 506.

As described above, the terminal equipment 200 receives the URL information and the selectable QCI information from the mobile equipment 220, and receives an input of one service category by the user from among the service categories corresponding to the selectable QCI information. Further, the terminal equipment 200 identifies QCI information corresponding to the input service category and transmits a control message including the identified QCI information to the mobile equipment 220. The mobile equipment 220 can then acquire QoS information according to the corresponding service by using the control message.

In the wireless communication system as described above, the process of service transmission/reception between the terminal equipment 200 and the mobile equipment 220 includes five stages, including: a first stage in which the mobile equipment 220 identifies a new packet and transmits a control message including QCI information; a second stage in which the terminal equipment 200 identifies service category information selected by a user from among service categories corresponding to QCI information received from the mobile equipment 220; a third stage in which the mobile equipment 220 identifies QoS information by using the QCI information corresponding to the service category selected by the user; a fourth stage in which the mobile equipment 220 receives an allocated radio resource and sets a packet filter; and a fifth stage in which the communication module 222 receives packets, which have been transmitted according to a corresponding application from a mobile communication network, through the packet filter. The five stages are sequentially performed.

Hereinafter, the five stages as described above will be described in more detail with reference to FIGS. 7 through 11.

The first stage in which the mobile equipment 220 identifies a new packet and transmits a control message including QCI information will be described with reference to FIG. 7.

Figure 7:
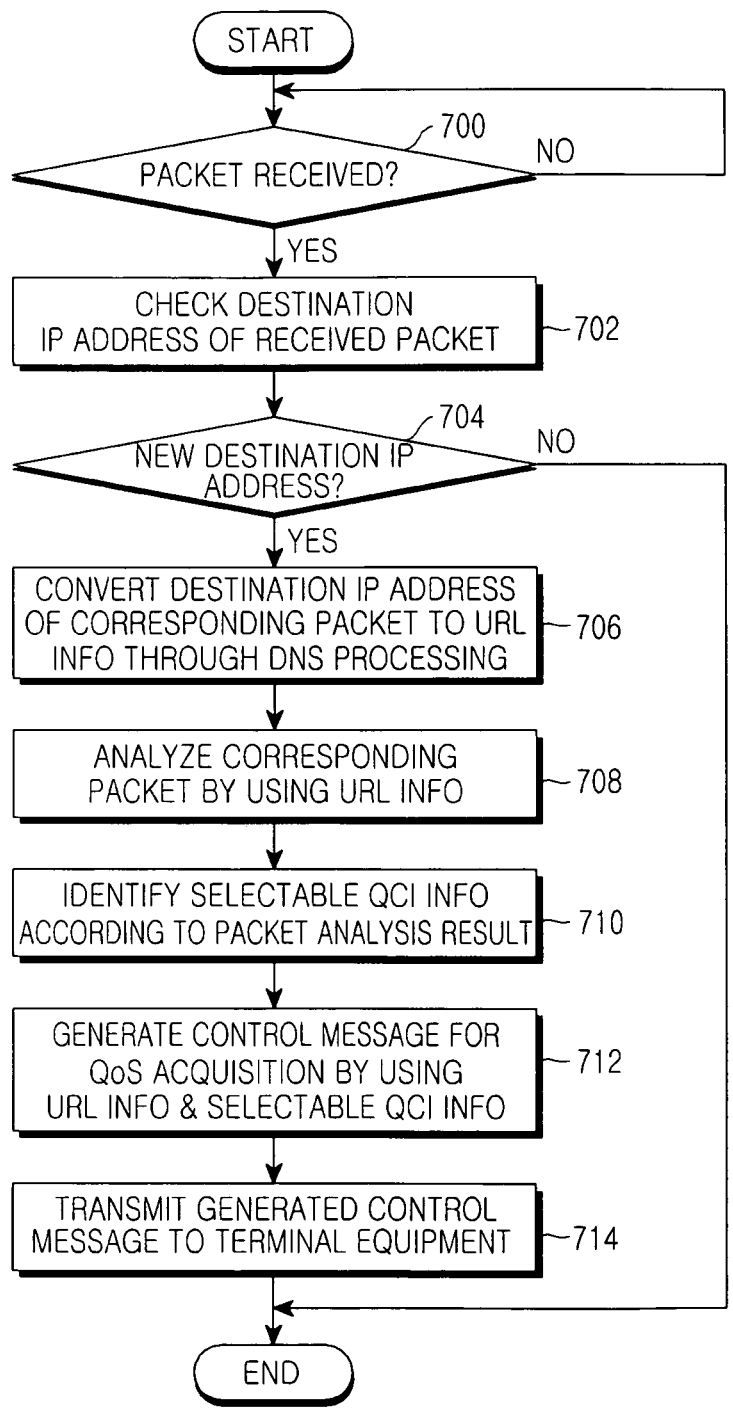
FIG. 7 illustrates a process of identifying a new packet and transmitting a control message including QCI information by a mobile equipment according to an embodiment of the present invention.

FIG. 7 illustrates a process of identifying a new packet and transmitting a control message including QCI information by a mobile equipment according to an embodiment of the present invention.

Referring to FIG. 7, in block 700, the packet monitoring unit 314 monitors all packets received through the transmitting/receiving unit 302 from the terminal equipment 200 while determining whether a packet has been received. The packet reception through the transmitting/receiving unit 302 may be achieved when the user newly executes an application, which is not currently being executed, or accesses another URL different from a currently connected URL.

In block 702, the packet filtering unit 316 checks a destination IP address of the received packet.

In block 704, the packet filtering unit 316 determines whether the checked destination IP address is a new destination IP address. That is, the packet filtering unit 316 determines whether the checked destination IP address is a new destination IP address different from a destination IP address of a previously received packet.

As a result of the determination, when the checked destination IP address is not a new destination IP address, the packet filtering unit 316 terminates the entire process. In contrast, as a result of the determination, when the checked destination IP address is a new destination IP address, the packet filtering unit 316 recognizes the received packet as a new packet and transmits the checked destination IP address to the DNS unit 306.

In block 706, the DNS unit 306 converts the destination IP address of the corresponding packet to URL information through DNS processing and stores the URL information.

In block 708, the packet analysis unit 318 analyzes the corresponding packet by using the URL information. The packet analysis unit 318 then analyzes the protocol, the port number, and such, acquired from the URL information, so as to determine the service to which the packet is related.

In block 710, the packet analysis unit 318 identifies selectable QCI information according to a result of the packet analysis. Specifically, the packet analysis unit 318 identifies the QCI corresponding to the packet based on the QoS index mapping table as shown in Table 1 described above.

The selectable QCI information output from the packet analysis unit 318 is output together with the corresponding URL information to the control packet processing unit 308. In block 712, the control packet processing unit 308 generates a control message for QoS acquisition by using the URL information and selectable QCI information. In an embodiment, the control message has a configuration as shown in FIG. 4.

In block 714, the transmitting/receiving unit 302 transmits the generated control message to the terminal equipment 200.

As described above, in the first stage, the mobile equipment 220 recognizes a packet that includes a new destination IP address, analyzes the packet to determine the service provided by the packet, and transmits a control message including selectable QCI information based on a result of the analysis to the terminal equipment 200.

The second stage in which the terminal equipment 200 identifies service category information selected by a user from among service categories corresponding to QCI information received from the mobile equipment 220 will be described with reference to FIG. 8.

Figure 8:
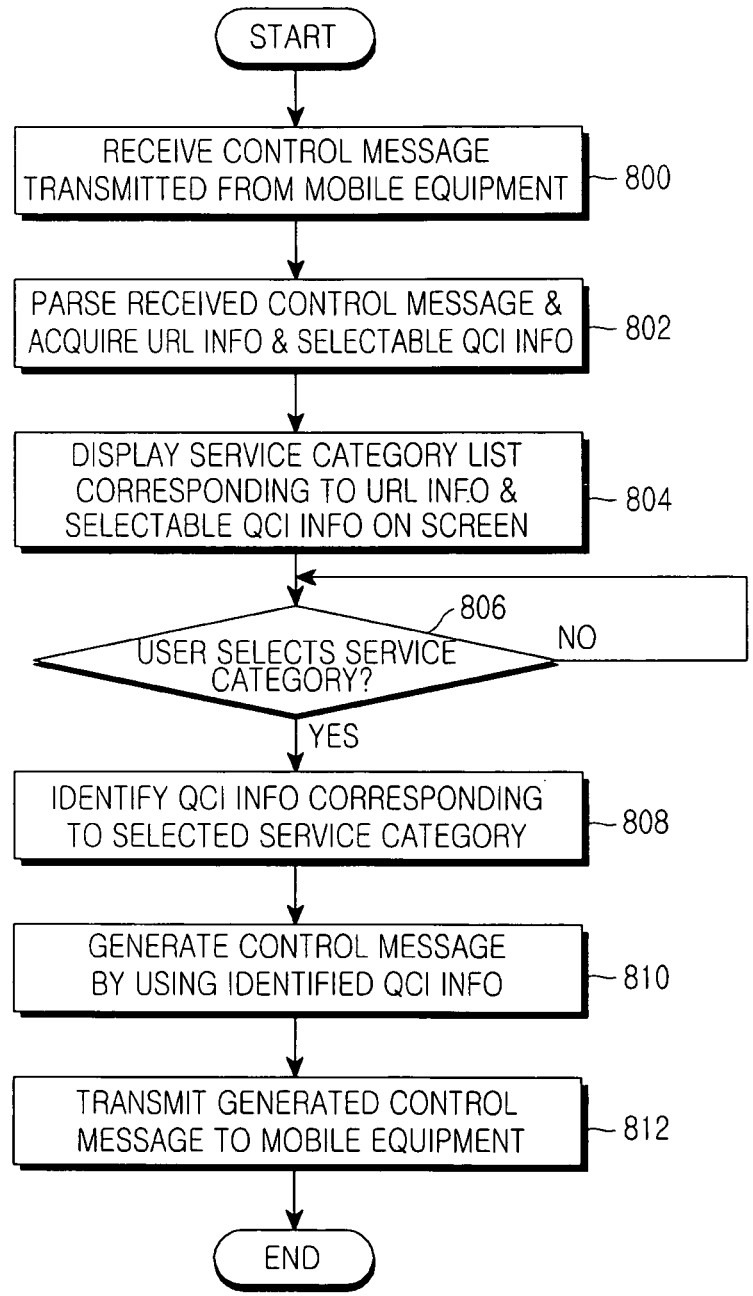
FIG. 8 illustrates a process in which a terminal equipment identifies service category information selected by a user from among service categories corresponding to QCI information received from the mobile equipment according to an embodiment of the present invention.

FIG. 8 illustrates a process in which a terminal equipment identifies service category information selected by a user from among service categories corresponding to QCI information received from the mobile equipment according to an embodiment of the present invention.

Referring to FIG. 8, in block 800, the transmission/reception unit 502 receives the control message transmitted from the mobile equipment 220. The received control message includes the URL information and the selectable QCI information.

In block 802, the packet processing unit 506 parses the received control message and acquires the URL information and the selectable QCI information from the parsed control message. The packet processing unit 506 outputs the URL information and the selectable QCI information to the display unit 508.

In block 804, the display unit 508 displays a service category list corresponding to the URL information and the selectable QCI information on a screen. The service category list corresponding to the selectable QCI information displayed on the display unit 508 may be generated by using the service category-based QCI mapping table as shown in Table 2.

In block 806, the control unit 500 determines whether the user has selected a service category. That is, the control unit 500 determines whether the user has input one of the service categories displayed on the display unit 508 through the input unit 510.

When the user has selected a service category, the control unit 500 proceeds to block 808, in which the control unit 500 identifies QCI information corresponding to the selected service category. The identified QCI information is output to the packet processing unit 506. In block 810, the packet processing unit 506 generates a control message by using the identified QCI information. The control message has the configuration as shown in FIG. 4 and includes the identified QCI information.

When the generation of the control message is completed, the transmission/reception unit 502 transmits the generated control message to the mobile equipment 220 in block 812.

In the second stage as described above, the terminal equipment 200 receives a control message including QCI information from the mobile equipment 220, receives an input of one service category from the user from among the service categories corresponding to the QCI information, and transmits a control message including QCI information corresponding to the input service category to the mobile equipment 220.

The third stage in which the mobile equipment 220 identifies QoS information by using the QCI information corresponding to the service category selected by the user will be described with reference to FIG. 9.

Figure 9:
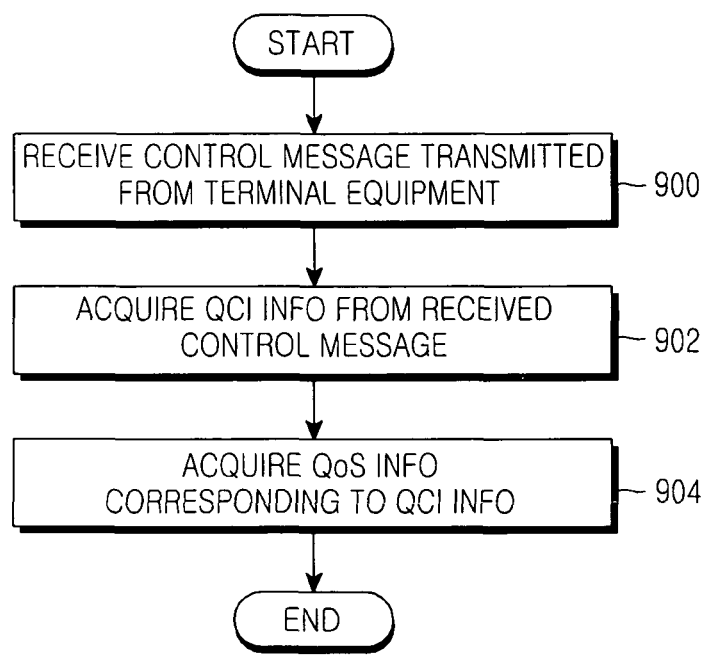
FIG. 9 illustrates a process in which a mobile equipment identifies QoS information by using the QCI information corresponding to the service category selected by the user according to an embodiment of the present invention.

FIG. 9 illustrates a process in which a mobile equipment identifies QoS information by using the QCI information corresponding to the service category selected by the user according to an embodiment of the present invention.

Referring to FIG. 9, in block 900, the transmitting/receiving unit 302 receives a control message transmitted from the terminal equipment 200. The received control message includes QCI information indicating the service category selected by the user.

In block 902, the QoS information processing unit 310 acquires the QCI information from the control message. Because the QCI information corresponds to an identifier indicating a particular QoS, the QoS information processing unit 310 can acquire QoS information corresponding to the acquired QCI information in block 904.

As noted from the third stage, the terminal equipment 200 does not unilaterally transmit the QoS information to the mobile equipment 220 but, rather, enables the mobile equipment 220 to determine the QoS information through the QCI information. Therefore, the mobile equipment 220 can connect with the terminal equipment 200 regardless of software information, and the user of the terminal equipment 200 can conveniently use the service of the mobile communication network through the mobile equipment 220.

Hereinafter, the fourth stage in which the mobile equipment 220 receives an allocated radio resource and sets a packet filter will be described with reference to FIG. 10.

Figure 10:
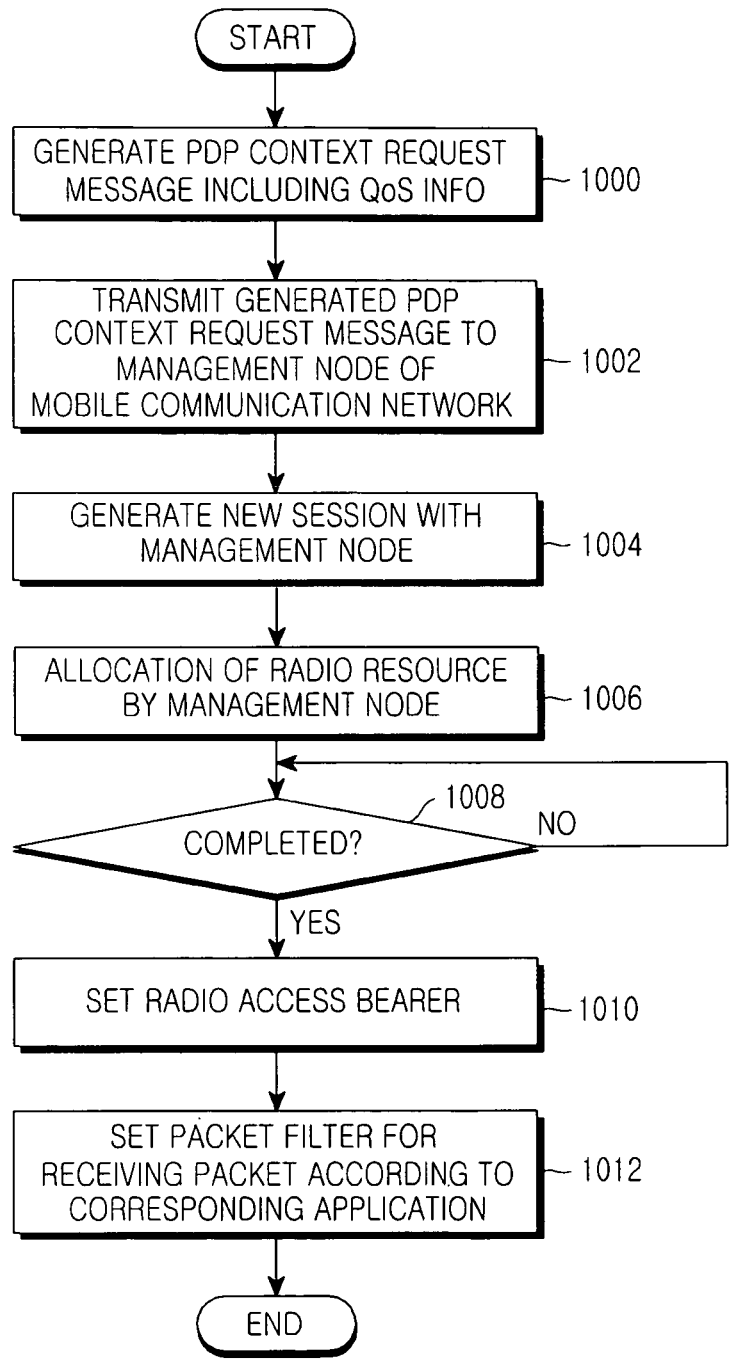
FIG. 10 illustrates a process in which a mobile equipment receives an allocated radio resource and sets a packet filter according to an embodiment of the present invention.

FIG. 10 illustrates a process in which a mobile equipment receives an allocated radio resource and sets a packet filter according to an embodiment of the present invention.

Referring to FIG. 10, in block 1000, the wireless communication unit 312 generates a PDP context request message including QoS information.

In block 1002, the wireless communication unit 312 transmits the generated PDP context request message to a management node of the mobile communication network. For example, the management node may be a Serving General Packet Radio Service (GPRS) Support Node (SGSN).

When a radio link with the terminal equipment 200 is established according to transmission of the PDP context request message, the wireless communication unit 312 generates a new session with the management node in block 1004. The generated session is used in order to receive a service from a particular application of the terminal equipment 200.

In block 1006, the wireless communication unit 312 receives allocation of a radio resource from the management node. When it is determined in block 1008 that the allocation of a radio resource has been completed, the wireless communication unit 312 proceeds to block 1010, in which the wireless communication unit 312 sets a radio access bearer.

In block 1012, the wireless communication unit 312 sets a packet filter for receiving a packet according to a corresponding application. The wireless communication unit 312 may then receive a packet according to an application providing the service selected by the user through the set radio bearer.

In the fourth stage as described above, the mobile equipment 220 generates a PDP context request message by using the acquired QoS information, receives allocation of a radio resource in response to the transmission of the PDP context request message, sets a radio access bearer, and sets a packet filter corresponding to a packet to be received. That is, even without receiving the QoS information, the mobile equipment 220 can acquire the QoS information and transmit a service according to a corresponding application to the terminal equipment 200.

Hereinafter, the fifth stage, which is the last of the five stages, will be described.

The fifth stage corresponds to a process, in which a mobile equipment 220 receives packets, which are transmitted according to a corresponding application from a mobile communication network, through a packet filter according to QoS information.

The fifth stage will now be described with reference to FIG. 11, which illustrates a process in which a mobile equipment receives packets that are transmitted according to a corresponding application from a mobile communication network through a packet filter according to QoS information according to an embodiment of the present invention.

Figure 11:
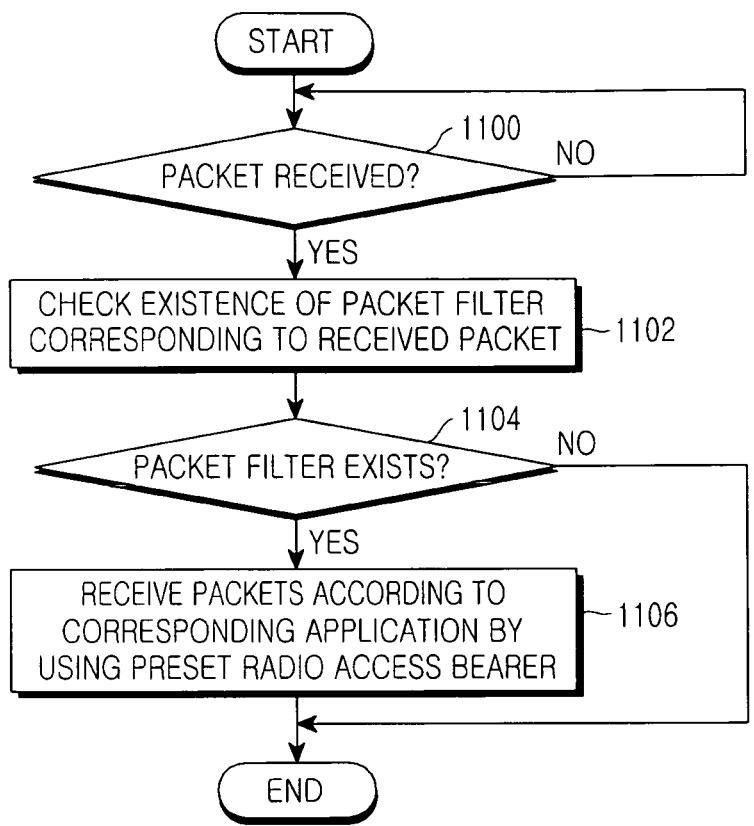
FIG. 11 illustrates a process in which a mobile equipment receives packets that are transmitted according to a corresponding application from a mobile communication network through a packet filter according to QoS information according to an embodiment of the present invention.

Referring to FIG. 11, in block 1100, the wireless communication unit 312 determines whether a packet based on an application of the terminal equipment 200 has been received. The wireless communication unit 312 monitors all packets received through the mobile communication network.

As a result of the determination, when a packet has been received, the wireless communication unit 312 checks an existence of a packet filter corresponding to the received packet in block 1102. When it is determined in block 1104 that the packet filter exists, the wireless communication unit 312 proceeds to block 1106, in which the wireless communication unit 312 receives packets according to an application of the packet by using a preset radio access bearer. Accordingly, a user of the mobile equipment 220 can achieve an optimum use of a desired service according to the acquired QoS information.

Meanwhile, when it is determined in block 1104 that the packet filter does not exist, the wireless communication unit 312 terminates the process of FIG. 11. In this situation, the first stage as shown in FIG. 7 can be performed again.

In the fifth stage as described above, the mobile equipment 220 receives packets according to the corresponding application by using the packet filter set in FIG. 10. In addition, the mobile equipment 220 transmits the received packet to the terminal equipment 200. Therefore, the user can continuously use the service from the desired application by using the mobile equipment 220.

Through the five stages or processes described above, the mobile equipment can determine QoS information even without separately receiving the QoS information from the terminal equipment. Furthermore, the mobile equipment can acquire accurate QoS information, so as to enable the user to use a service with an optimum performance.

According to the present invention, without updating an application of a terminal equipment or using an additional interface, a mobile equipment can acquire QoS information of the application. Additionally, a mobile equipment can determine accurate QoS information corresponding to a service, generate a radio link according to the acquired QoS, and transmit an optimum service to a user of the terminal equipment.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of receiving a service by a mobile equipment in a wireless communication system, the method comprising:
receiving a packet through a direct communication with a terminal equipment providing a service;
if the received packet is a packet having a new destination Internet Protocol (IP) address different from a destination IP address of a previously received packet, identifying one or more service quality identifiers corresponding to the received packet, wherein the received packet and the previously received packet have a same flow;
transmitting the one or more service quality identifiers to the terminal equipment;
receiving a service quality identifier selected by the terminal equipment from among the one or more service quality identifiers;
determining Quality of Service (QoS) information corresponding to the selected service quality identifier;
generating a radio link between the mobile equipment and a mobile communication network according to the determined QoS information; and
receiving the service from the mobile communication network through the radio link.

2. The method of claim 1, wherein each of the one or more service quality identifiers and the selected service quality identifier comprises a QoS Class Identifier (QCI).

3. The method of claim 1, wherein receiving the packet through the direct communication with the terminal equipment comprises receiving the packet from the terminal equipment by using one of a Universal Serial Bus (USB) and Personal Computer Memory Card International Association (PCMCIA) slot, if the terminal equipment performs one of newly executing an application and accessing a Uniform Resource Locator (URL) that is different from a currently connected URL.

4. The method of claim 1, wherein identifying the one or more service quality identifiers corresponding to the received packet comprises:
converting a destination IP address of the received packet to a Uniform Resource Locator (URL) information;
acquiring a port number and protocol information from the URL information;
identifying one or more service categories corresponding to the received packet by using the acquired port number and protocol information; and
determining the one or more service quality identifiers corresponding to the identified one or more service categories.

5. The method of claim 4, wherein transmitting the one or more service quality identifiers comprises transmitting the URL information together with the one or more service quality identifiers to the terminal equipment.

6. The method of claim 1, wherein generating the radio link between the mobile equipment and the mobile communication network comprises:
generating a connection request message by using the determined QoS information, the connection request message being a message for requesting a connection with the mobile communication network;
transmitting the connection request message to the mobile communication network;
receiving allocation of a radio resource from the mobile communication network;
setting a radio access bearer based on the radio resources; and
setting a packet filter for receiving service packets corresponding to the service by using the set radio access bearer.

7. A method of transmitting a service by a terminal equipment in a wireless communication system, the method comprising:
transmitting a packet through a direct communication to a mobile equipment connected to a mobile communication network;
if the transmitted packet is a packet having a new destination Internet Protocol (IP) address different from a destination IP address of a previously transmitted packet, receiving one or more service quality identifiers corresponding to one or more service categories according to the transmitted packet from the mobile equipment, wherein the transmitted packet and the previously transmitted packet have a same flow;
selecting one among the one or more service categories corresponding to the received one or more service quality identifiers;
transmitting a selected service quality identifier corresponding to the selected service category selected by the user to the mobile equipment; and
if a radio link is generated between the mobile equipment and the mobile communication network, receiving, from the mobile equipment, the service transmitted through the radio link.

8. The method of claim 7, wherein each of the one or more service quality identifiers and the selected service quality identifier comprises a Quality of Service (QoS) Class Identifier (QCI).

9. The method of claim 7, wherein transmitting the packet through the direct communication to the mobile equipment comprises transmitting a packet to the mobile equipment by using one of a Universal Serial Bus (USB) and Personal Computer Memory Card International Association (PCMCIA) slot, if the mobile equipment performs one of newly executing an application and accessing a Uniform Resource Locator (URL) that is different from a currently connected URL.

10. A mobile equipment in a wireless communication system, the mobile equipment comprising:
a direct communication unit configured to receive a packet through a direct communication with a terminal equipment providing a service, transmit one or more service quality identifiers identified based on the received packet to the terminal equipment, and receive a service quality identifier selected by the terminal equipment from among the one or more service quality identifiers corresponding to the received packet;
a packet processing unit configured to, if the received packet includes a new destination Internet Protocol (IP) address different from an IP address of a previously received packet, identify the one or more service quality identifiers corresponding to the received packet, wherein the received packet and the previously received packet have a same flow;
a Quality of Service (QoS) information processing unit configured to determine QoS information corresponding to the selected service quality identifier; and
a wireless communication unit configured to generate a radio link between the mobile equipment and a mobile communication network according to the acquired QoS information and receive the service from the mobile communication network through the radio link.

11. The mobile equipment of claim 10, wherein each of the one or more service quality identifiers and the selected service quality identifier comprises a QoS Class Identifier (QCI).

12. The mobile equipment of claim 10, wherein the direct communication unit receives a packet from the terminal equipment by using one of a Universal Serial Bus (USB) and Personal Computer Memory Card International Association (PCMCIA) slot, if the terminal equipment performs one of newly executing an application and accessing a Uniform Resource Locator (URL) different from a currently connected URL.

13. The mobile equipment of claim 10, wherein the packet processing unit comprises:
 a packet monitoring unit configured to monitor the received packet;
 a packet filtering unit configured to determine whether the monitored packet includes the new destination IP address, and identifies the monitored packet as a new packet, if the monitored packet includes the new destination IP address; and
 a packet filtering unit configured to identify the one or more service quality identifiers corresponding to the new packet, the one or more service quality identifiers corresponding to one or more service categories.

14. The mobile equipment of claim 10, further comprising a Domain Name System (DNS) unit configured to convert the destination IP address of the new packet to Uniform Resource Locator (URL) information.

15. The mobile equipment of claim 14, wherein the packet analysis unit acquires a port number and protocol information from the URL information output from the DNS unit and identifies the one or more service categories corresponding to the new packet by using the acquired port number and protocol information, and determines the one or more service quality identifiers corresponding the one or more service categories.

16. The mobile equipment of claim 14, wherein the direct communication unit transmits the URL information output from the DNS unit together with the one or more service quality identifiers to the terminal equipment.

17. The mobile equipment of claim 10, wherein the wireless communication unit generates a connection request message by using the determined QoS information, the connection request message being a message for requesting a connection with the mobile communication network, transmits the connection request message to the mobile communication network, sets a radio access bearer, if a radio resource has been allocated from the mobile communication network, sets a radio access bearer based on the radio resource, sets a packet filter for receiving service packets corresponding to the service by using the set radio access bearer, and receives the service packets by using the set packet filter.

18. A terminal equipment in a wireless communication system, the apparatus comprising:
 a direct communication unit configured to transmit a packet through a direct communication to a mobile equipment connected to a mobile communication network, if the transmitted packet is a packet having a new destination Internet Protocol (IP) address different from a destination IP address of a previously transmitted packet, receive one or more service quality identifiers corresponding to one or more service categories according to the transmitted packet from the mobile equipment, and transmit a selected service quality identifier corresponding to a service category selected by the terminal equipment to the mobile equipment, wherein the transmitted packet and the previously transmitted packet have a same flow;
 an input unit configured to select one among the one or more service categories corresponding to the received one or more service quality identifiers; and
 an application unit configured to, if a radio link is generated between the mobile equipment and the mobile communication network, receiving, from the mobile equipment, the service transmitted through the radio link.

19. The terminal equipment of claim 18, wherein each of the one or more service quality identifiers and the selected service quality identifier comprises a Quality of Service (QoS) Class Identifier (QCI).

20. The terminal equipment of claim 18, wherein the direct communication unit transmits a packet to the mobile equipment by using one of a Universal Serial Bus (USB) and Personal Computer Memory Card International Association (PCMCIA) slot, if the terminal equipment performs one of newly executing an application and accessing a Uniform Resource Locator (URL) different from a currently connected URL.

* * * * *